US005553311A

United States Patent [19]
McLaughlin et al.

[11] Patent Number: 5,553,311
[45] Date of Patent: Sep. 3, 1996

[54] CUSTOMER PREMISE DEVICE FOR CONTROLLING DATA TRANSMISSIONS BY STORING A LIMITED NUMBER OF OPERATION ALGORITHMS AND RECEIVING OPERATION INSTRUCTIONS FROM EXTERNAL SOURCES

[75] Inventors: Robert McLaughlin, Arlington, Va.; M. James Bullen, Oakville, Canada

[73] Assignee: Image Telecommunications Inc., Westport, Conn.

[21] Appl. No.: 197,810

[22] Filed: Feb. 17, 1994

[51] Int. Cl.⁶ .................................................. G06F 13/14
[52] U.S. Cl. ............................ 395/884; 348/7; 348/10; 348/12; 395/883; 395/893; 395/650
[58] Field of Search ....................................... 395/325, 650, 395/883, 884, 893; 348/7, 10, 12

[56] References Cited

U.S. PATENT DOCUMENTS

| | | |
|---|---|---|
| 4,538,174 | 8/1985 | Gargini et al. . |
| 4,763,317 | 8/1988 | Lehman et al. ............................ 370/58 |
| 5,003,591 | 3/1991 | Kauffman et al. ......................... 380/10 |
| 5,014,125 | 5/1991 | Pocock et al. ............................. 358/86 |
| 5,027,400 | 6/1991 | Baji et al. ................................... 380/20 |
| 5,062,059 | 10/1991 | Youngblood et al. ................... 395/275 |
| 5,130,792 | 7/1992 | Tindell et al. ............................. 358/85 |
| 5,132,992 | 7/1992 | Yurt et al. ................................. 375/240 |
| 5,133,079 | 7/1992 | Ballantyne et al. ...................... 455/4.1 |
| 5,153,884 | 10/1992 | Lucak et al. .............................. 371/32 |
| 5,191,410 | 3/1993 | McCalley et al. ......................... 358/86 |
| 5,247,347 | 9/1993 | Litteral et al. ............................. 358/85 |
| 5,253,341 | 10/1993 | Rozmanith et al. ...................... 395/200 |
| 5,261,114 | 11/1993 | Raasch et al. ............................. 395/800 |
| 5,369,784 | 11/1994 | Nelson ...................................... 455/51.2 |
| 5,371,532 | 12/1994 | Gelman et al. ............................ 348/7 |
| 5,374,952 | 12/1994 | Flohr ......................................... 348/12 |
| 5,400,331 | 3/1995 | Lucak et al. .............................. 370/85.1 |

OTHER PUBLICATIONS

Chang, et al. An Open System Approach to Video on Demand, IEEE Communications Magazine, May 1994, pp. 68–80.

Deloddere, et al., Interactive Video On Demand, IEEE Communications Magazine, May 1994, pp. 82–88.

J. Richard Jones, Baseband and Passband Transport Systems For Interactive Video Services, IEEE Communications Magazine, May 1994, pp. 90–101.

*Primary Examiner*—Ken S. Kim
*Attorney, Agent, or Firm*—Sughrue, Mion, Zinn, Macpeak & Seas

[57] ABSTRACT

Customer Premise Devices (CPDs) and associated methods according to the invention allow subscribers to send diverse subscriber requests and to receive incoming information such as movies, videogames, educational, business and consumer information, and scientific and other reaserach-related database information. The CPD controls transmissions, carried over a communications medium, between a central information source and customer premise equipment, such as TVs and computers, housed at a remote station. The CPD has (a) a first interface linked to the communications medium; (b) a second interface linked to the customer premise equipment; and (c) an interface controller linking the first interface and the second interface. The interface controller includes (c1) an operations memory for storing a limited number of operations algorithms; (c2) an instructions memory for temporarily storing operation instructions received via at least one of the interfaces; and (c3) a processor that (i) accesses any of the operations memory, the instructions memory and the interfaces, (ii) that processes the operations algorithms and operation instructions, thereby generating prompt signals and processing results, (iii) that routes the prompt signals to at least one of the interfaces or one of the memories in accordance with the processing results, and (iv) that routes data streams, supplied from the central information source, from the first interface to the second interface, in accordance with the processing results.

49 Claims, 8 Drawing Sheets

CUSTOMER PREMISE DEVICE FOR CONTROLLING DATA TRANSMISSIONS BY STORING A LIMITED NUMBER OF OPERATION ALGORITHMS AND RECEIVING OPERATION INSTRUCTIONS FROM EXTERNAL SOURCES

RELATED APPLICATION INFORMATION

This application is related to co-pending Application Ser. No. 08/136,185, filed Oct. 15, 1993, the disclosure of which is incorporated herein by reference. This co-pending application relates to an Information Service Control Point for controlling data transmissions from a central station to remote stations that are equipped with a Customer Premise Device such as the ones described in the instant application. The Information Service Control Point disclosed in the co-pending application is one advantageous alternative for a central information service capable of being linked to the instant Customer Premise Devices. However, the Customer Premise Devices according to the present invention can be structured and operated to communicate equally well with other central information service arrangements.

BACKGROUND OF THE INVENTION

2. Field of the Invention

The present invention relates to customer premise devices (CPDs) capable of providing new and enhanced information-related services to consumers. Specifically, customer premise equipment designed in accordance with the present invention provides customers with the ability to send diverse subscriber requests and to receive and process incoming information. The content of the information translated by the CPD can be of any type, and can include movies, video games and other entertainment programs, educational information and programs, scientific and other research-related database information, business and consumer information, and the like (hereinafter, "information", "services" or "titles").

2. Description of the Related Art

Consumer demand for enhanced on-site entertainment and other information services is on the rise. Examples of such information services include so-called "on-demand" video, interactive video games, database research, "home-shopping", etc. Numerous service providers are currently eager to tap this demand, and are therefore expressing interest in schemes for providing such services to consumers. The efforts currently being expended by service providers, as well as the current state of progress in this field of technology are described, e.g., in TIME Magazine, Apr. 12, 1993, at 49ff., and Newsweek, May 31, 1993, at 39ff.

In order to be economically practical and viable, a system offering the wide range of information-related services just described should preferably be able to (i) permit access to large volumes of data (i.e., to a large number of titles), (ii) service a large number of consumers, and (iii) transfer data (i.e., titles) to the end user quickly, preferably in "real time". Further, the consensus prefers a system arranged as a centralized facility capable of communicating with remote stations (e.g., homes, offices, public gathering locations, etc.) via existing or next-generation communications media.

Particular on-going efforts related to the present invention include a system being developed by Broadband Technologies. General elements of the Broadband Technologies system, as understood, are illustrated in FIG. 9. As shown, a subscriber's remote location 901 is connected over a standard telecommunications network 902 to a central facility 903. The central facility 903 awaits service requests from its subscribers.

When a given subscriber wishes to view a selection (e.g., a movie), he or she places a telephone call to the central facility 903 using a standard telephone 904. The call is routed via standard telephone switches 905 (e.g., EO and AT switches) over the telephone voice path of a standard telephone line 906 (e.g., 24-gauge twisted pair copper wire). The telephone call is directed to a Voice Response Unit (VRU) 907 located in the central facility. The VRU forwards the subscriber request to an on-site attendant 908, e.g., through a paper printout. The operator 908 reviews the request, then retrieves the requested selection from an in-house library 909. Finally, the operator 908 locates an available playback unit 910 in a playback battery 911 and loads and plays the selection accordingly.

The output signal of the playback unit 910 is supplied to an interface unit 912 coupled between the playback unit 910 and the VRU 907 in the central facility 903. The interface 912 compresses the signal received and forwards the compressed signal via the VRU 907 to the telephone voice path of the telephone line 906. From there, the signal is routed to the subscriber's telephone 904 at the remote station 901. A further interface 913 retrieves the signal, decompresses it, and passes it to the subscriber's television set 914.

As such, the Broadband Technologies system succeeds in providing an adequate transfer of video data over existing switches and transmission lines. The signal received at the remote location 901 corresponds in quality approximately to that of a conventional slow-play VHS mode signal. Furthermore, this system, while not truly "interactive", does provide limited system responses to remotely transmitted user requests. However, the system suffers under a range of inefficiencies, limitations on size and flexibility, and limitations on interactiveness. Finally, the system must be directly linked to the subscriber's telephone 904, thereby monopolizing the telephone line.

An additional pilot system being developed, known as the AT&T Leesburg Project, overcomes at least some of the problems noted above. General elements of the Leesburg system, as understood, are illustrated in FIG. 10. As apparent from the figure, the Leesburg system is very similar to the Broadband Technologies system, except that the request and response signals are not routed via standard telephone lines. Instead, the request and the response transmission are routed between the remote location 1001 and the central facility 1003 via a fiber-optic cable system 1002.

In operation, a subscriber request is initiated via a customized telephone or control unit 1004 connected to a special cable converter box 1013 installed at the remote location 1001. The request is transmitted over the fiber system 1002 to a Voice Response Unit (VRU) 1007 located at the central facility 1003.

The operations at the central facility are the same as those described above with respect to the Broadband Technologies system, except that the output signal of the playback unit 1010 is supplied to an interface unit 1012 directly coupled to the fiber system 1002. The special cable converter box 1013 at the remote end retrieves the signal and passes it on to the subscriber's television 1014.

Since the Leesburg system benefits from the larger data transmission capacity of fiber-optics over standard copper wire (approx. 150 Mbits/sec versus approx. 1.5 Mbits/sec), the resulting quality of the data signal is enhanced relative to that of the signal delivered by the Broadband Technologies system. Moreover, this system does not monopolize the subscriber's telephone line. However, this system fails to overcome the other problems noted, namely inefficiency, limitations on size and flexibility, and limitations on interactiveness. Also, it requires a system of fiber-optic cable dedicated to the uses described above, to be laid and maintained, contributing immensely to the cost of the overall system.

FIG. 11 schematically illustrates yet another ongoing effort in the field of information services. This system, being developed by EON Corp. (formerly, TV Answer), is a wireless communications service. At the remote station 1101, a personal TV unit 1102 is connected directly with the subscriber's television 1103. Other home entertainment devices, e.g., a VCR 1104 can also be connected to the unit 1102. A remote control 1105 allows the subscriber to access icons and menus in order to select programs and services. Once the subscriber has input a request, the unit 1102 emits a broadcast signal over an allocated radio channel to a cell site 1106. The cell site 1106, in turn, communicates with a geostationary satellite 1107 linking the cell site and a central switch 1108. The switch 1108 performs network control, security, and transaction routing. The subscriber request is then forwarded via satellite 1107 to the service provider 1109 offering the service requested by the subscriber. The request is processed by the provider, and the service response is then transmitted to the subscriber's location 1101 along an appropriate return path. Once received at the subscriber's station 1101, the incoming information is decrypted by the unit 1102 and forwarded to the television 1103. While this system is designed to enable interactive communications, its use of radio communications places a limit on the amount of data, and thus services, that can be transmitted. Further, the personal TV unit 1102 houses all of the intelligence required to process and route the subscriber requests and service responses. This necessitates high-speed processing capabilities and significant on-site memory capacity, which translates into very high manufacturing costs for each individual personal TV unit 1102.

SUMMARY OF THE INVENTION

One object of the present invention is to provide a customer premise device and associated method for controlling transmissions between a central station and a remote station. More specifically, it is an object to provide a device capable of accepting transmissions from and outputting transmissions to a communications medium, and to convert incoming transmissions into a form useable by subscriber premise equipment connected to the device. A related object is to provide a device that creates a transparent interface between the central station and the remote station. In other words, according to the invention, the device is flexible enough to accept a wide range of transmission formats and to be connected to various types of communication media. Further, an object is to provide a device structured to be independent of the informational content of the transmissions.

It is also an object to provide a device of limited intelligence that is relatively inexpensive to manufacture, which is nonetheless structured to be transparent and flexible, as described above, and which nonetheless offers the subscriber a wide range in options and services.

A further object is to provide a customer premise device that is versatile and easily upgraded. Further, it is an object to allow devices installed at remote locations to be upgraded or otherwise modified from a central location.

Another object of the present invention is providing a customer premise device that interferes only minimally with existing subscriber lines, such as telephone lines, and is thus relatively inconspicuous to the subscriber.

These and other objects are solved by the present invention in its various embodiments. In its most general formulation, the present invention provides a method and an apparatus for controlling transmissions, carried over a communications medium, between a central information source and customer premise equipment housed at a remote station. The customer premise device comprises:

a first interface linked to the communications medium;

a second interface linked to the customer premise equipment; and an interface controller linking said first interface and said second interface, said interface controller comprising:

an operations memory for storing a limited number of operations algorithms;

an instructions memory for temporarily storing operation instructions received via at least one of said interfaces; and a processor for accessing any of said operations memory, said instructions memory and said interfaces, for processing the operations algorithms and operation instructions, thereby generating prompt signals and processing results, for routing the prompt signals to at least one of said interfaces or one of said memories in accordance with the processing results, and for routing data streams, supplied from the central information source, from said first interface to said second interface, in accordance with the processing results.

The method for supplying a remote station with transmitted information originating from a central station, comprises the steps of:

providing a communications link between the central station and the remote station, the communications link having a remote station end;

connecting a customer premise device to the communications link at the remote station end and connecting the customer premise device to customer premise equipment;

providing the customer premise device with a limited amount of control logic sufficient to generate prompt signals in response to command signals input by a customer via the customer premise equipment, forward the prompt signals to the communications link to be supplied to the central station, generate processing signals in response to control signals input from the central station via the communications link, and routing the transmitted information to the customer premise equipment in accordance with the processing signals.

BRIEF DESCRIPTION OF THE DRAWINGS

Preferred embodiments of the invention are described, by way of example, with reference to the accompanying drawings, in which.

DETAILED DESCRIPTION OF THE PREFERRED EMBODIMENTS

Figure 1:
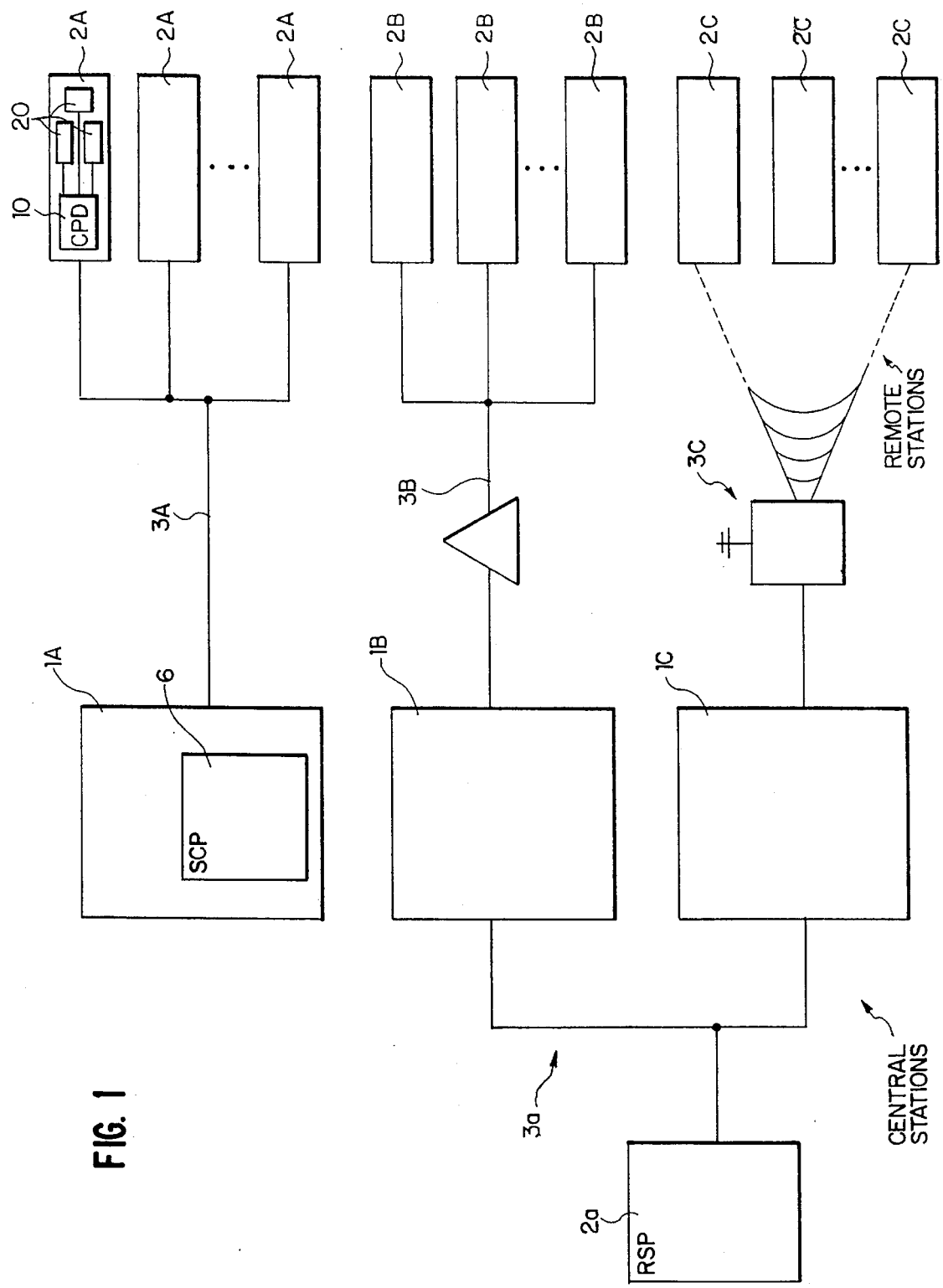
FIG. 1 shows elements forming a communications system into which the present invention is incorporated.

FIG. 1 and Introduction

FIG. 1 shows, in general terms, elements forming various communications systems into which a customer premise device (CPD) according to the present invention can be incorporated. The CPD can be incorporated into a number of different communications systems with only relatively minor adjustments being necessary. As such, it is possible to incorporate the present invention into a variety of communications systems presently existing or yet to be developed. Two examples of existing systems capable of supporting the present invention are a telephone network and a cable TV service.

As shown in FIG. 1, the communications systems include one or more central stations 1, a plurality of respective remote stations 2A, 2B, 2C, and respective communication networks 3A, 3B, 3C, connecting the central and remote stations. The communication itself is composed of two parts, namely a signalling part (protocols) and a transmission part (user data). In practice, each communication network 3A–3C is capable of supporting a large number of individual stations 2A–2C, as indicated by the dots between remote stations.

The present invention is not limited to any particular choice of transmission medium or transmission technology, and can be readily adapted to a variety of systems. Existing telephone or cable lines can be used. If narrow bandwidth media, such as copper wire or coaxial cable, are used, compression schemes are employed to transmit data effectively. If door-to-door fiber-optic cable is available, this type of medium, given its broadband characteristics, is preferably employed. Digital cellular, PCS (Personal Communication Services), or satellite transmission techniques, while presently less desirable, are equally feasible.

To illustrate these various alternatives, FIG. 1 shows various central stations linked to respective remote stations 2. Thus, a cable central station 1A communicates with remote stations 2A via a cable line 3A. A telephone network 3B supports communications between a central station 1B and remote stations 2B. Remote stations 2C utilize an alternate system, such as a cellular-type network, to communicate with a central station 1C. Communications over a cable network 3A can be conducted, e.g., over devices known as frames in the art (not shown). If communication proceeds via a telecommunications network 3B, trunk processors and various classes of switches (e.g., EO and AT) would most likely form part of the network. PCS or cellular communications also could make use of existing network arrangements, if desired.

For purposes of simplicity, subsequent discussion of the central stations 1A–1C, the remote stations 2A–2C and the communications paths 3–3B will simply reference central station 1, remote station 2 and communications path 3. Unless specified otherwise, such discussion is equally applicable or readily adaptable to the other forms of remote stations and communication links.

The point of origin for services can be either a Service Control Point (SCP) 6, internal to the central station 1, or the facilities 2a of a remotely-located service provider (RSP). Requests for service are generally initiated at the remote stations 2, but can be issued from the SCP 6 or the service provider's facility 2a as well.

In order for communications to be sent from and received by the remote stations 2, the present invention provides a CPD 10 associated with each remote station 2. The CPD either incorporates a subscriber terminal or, preferably, is connected directly or indirectly to one or more home or business electronics devices 20, such as a TV, a VCR, a computer, stereo system, printer, etc.

In operation, the CPD 10 allows the user to remotely interact with the SCP 6 or the RSP 2a by forwarding the user's requests to the central station 1. Additionally, the CPD 10 processes incoming information into a form that is decipherable by the particular device 20 to which the information is directed, and routes the information to the particular device. Besides these basic functions, further functions, introduced below, can be incorporated into the CPD.

The construction and operation of the CPD 10 is, at least in part, dependent upon the communications network to which it is linked. Therefore, various embodiments of the CPD designed for a variety of networks are described as preferred embodiments of the invention. Further, CPDs according to the present invention can be engineered to provide various levels and types of functional capability, depending on the sophistication of the individual CPD. As such, the preferred embodiments introduce, by way of example, a variety of functions that can be incorporated into a given CPD.

Figure 2:
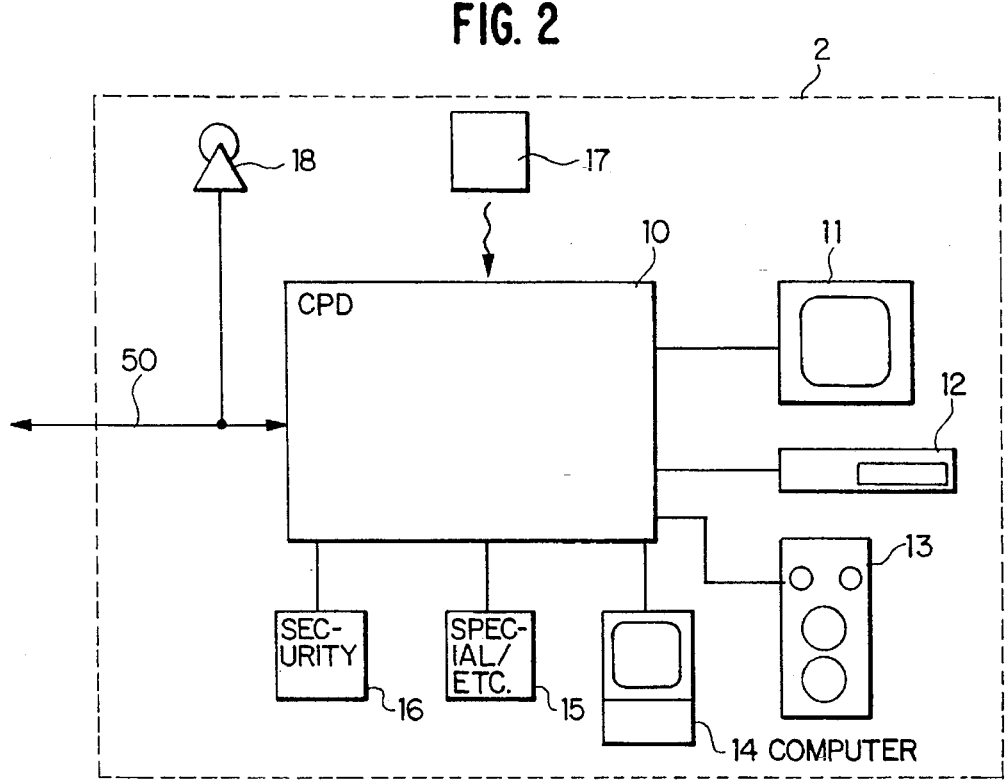
FIG. 2 is a functional block diagram of a Customer Premise Device and associated peripheral user premise equipment.
Figure 3:
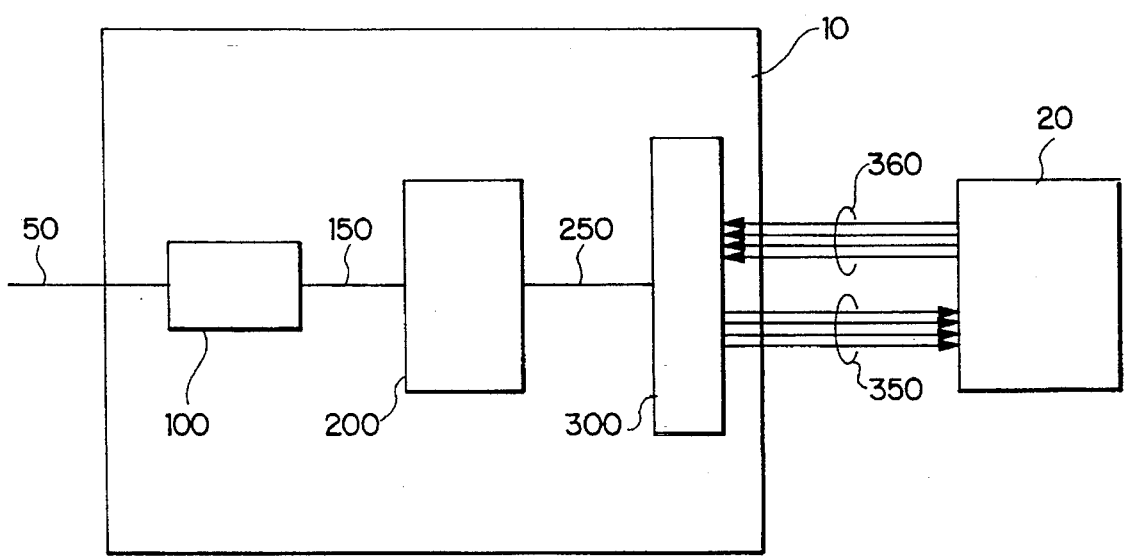
FIG. 3 is a block diagram showing internal details of a Customer Premise Device.

FIGS. 2–3: Customer Premise Device, in General

FIGS. 2 and 3 show one embodiment of a CPD 10 in its environment at the remote station 2 and in block diagram form. The CPD 10 is connected to a line 50 of the communications path 3 in a manner allowing it both to send and receive transmissions to and from the central station 1. The CPD 10 also has an array of input ports 360 and output ports 350 allowing it to be connected, directly or indirectly, to a wide variety of user premise equipment 20. For instance, the CPD 10 can accommodate some or all of the following: a television set 11, a VCR 12, an audio system 13 such as a stereo or surround-sound system, a computer 14, specialized equipment 15 such as a videogame unit, keyboard, printer, videophone system, or the like, and security or emergency devices 16 such as a burglar or fire alarm. In addition, a remote control, keypad or analogous device 17 (hereinafter "remote control") is provided for controlling the CPD 10. The remote control 17 can be used either in lieu of or in conjunction with the equipment 11–16 listed above. In the embodiment of FIG. 2, a telephone 18 is coupled to the line 50, and operates analogously to a standard telephone, allowing the user to make outgoing and receive incoming calls.

In essence, the CPD is a device capable of accepting and interpreting commands from a distantly-located command center for the purpose of forwarding communications to end user equipment. As such, the CPD must encompass (a) a communications interface, (b) some form of processor, preferably a general purpose microprocessor, (c) hardware or software associated with the processor that is capable of interpreting the commands and a communications protocol, and (d) an interface to forward the processed communications to the user equipment.

FIGS. 3–6: Structure of Customer Premise Device

Internally, the CPD 10 is broadly subdivided into a first interface 100, an interface controller 200 and a second interface 300. The first interface 100 forms the connection of the CPD to the line 50 of the communications path 3. The second interface 300 connects the CPD 10 to the user premise equipment 20. The lines 350 and 360 can take any appropriate form, e.g., an electrical wire to the television 11 and an electromagnetic wave (e.g., infra-red) from the remote 17. Also, the lines 350 and 360 can be uni-directional or two-way paths, as needed. Lines 150 and 250 represent communication channels, e.g., buses, between the interface controller 200 and the first and second interfaces 100 and 300, respectively. As will be explained in greater detail below, the controller 200 receives, processes and routes signals received from or destined for either of the interfaces 100 and 200. Thus, the CPD 10 acts as a conduit and processing mechanism for information passing between the user premise equipment 20 and the line 50 (and onward to the central station 1). Since this information can originate at either end (i.e., from equipment 20 or from, e.g., the central station 1), the CPD 10 provides a two-way communication unit capable of supporting interactive information exchange. Further, since plural remote stations 2 can communicate with the central station 1 and be linked by the central station 1, two-way communication or even higher levels of interaction between remote stations 2 can be supported by the CPD 10.

Figure 4A:
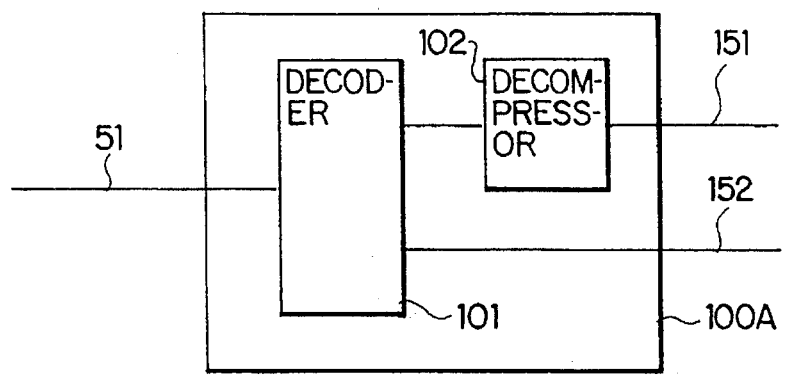
FIGS. 4A, 4B and, 4C each shown an individual embodiment for the first interface of FIG. 3, to render Customer Premise Devices compatible with a variety of communication networks.
Figure 4B:
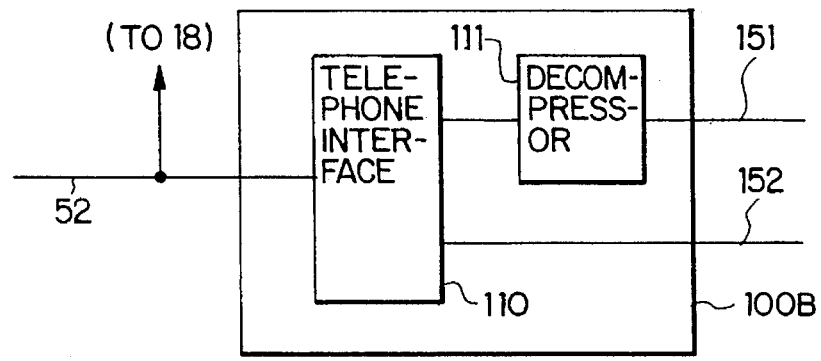
Figure 4C:
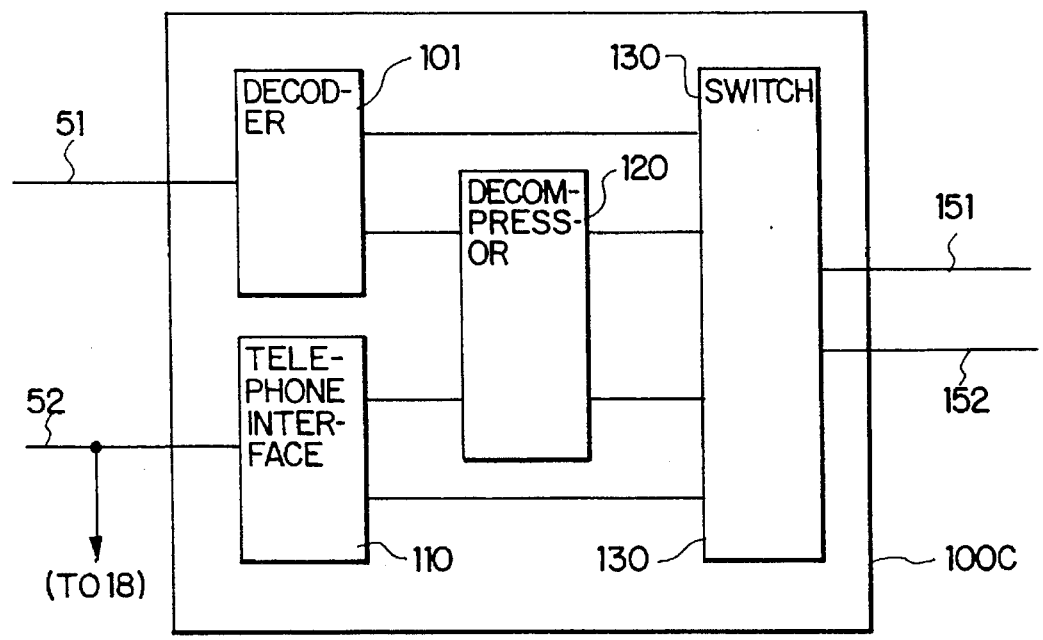

The details of the first interface 100 depend upon (a) the signal format employed for transmitting information from the central station and (b) the specifications of the local access provider of the communications path 3. FIGS. 4A–4C show three different embodiments of the first interface 100, each adapted to a different form of communications network 3.

FIG. 4A shows an interface 100A adapted for use with a cable network. A cable decoder 101 is connected to a cable line 51 and receives video and audio portions of a title transmitted from the central station 1. The decoder 101 outputs the video portion of the title via a decompressor 102 and over a video line 151 and outputs the audio portion over an audio line 152. The decompression technology is advantageously incorporated into the CPD 10 to provide a standard 45 MHz NSTC or superior output video signal. Also transmitted with the video and audio stream are operation instructions used by the CPD 10 to regulate the video and audio stream. The operation instructions, also received via cable line 51, are decoded by the decoder 101 and preferably output over the audio line 152. Both the video line 151 and audio line 152 preferably lead to a switch 202 in the controller 200. The decompressor 102 need not necessarily be provided in the interface 100A; alternatively, the decompressor 102 can form part of the controller 200 or part of the second interface 300, such that the controller 200 receives compressed title information rather than decompressed information. Further, if the communications path 3 is embodied in a broadband medium such as fiber-optic cable, the decompressor 102 can be omitted entirely if desired.

The decoder 101 also receives and forwards prompt signals supplied from the controller 200 and destined for the central station 1. These prompt signals, to be explained in greater detail below, preferably travel via audio line 152 directly to the decoder 101 without passing through the decompressor 102.

FIG. 4B shows an interface 100B adapted for use with a telephone network. The interface 100B includes a telephone interface 110 and also a decompressor 111. The line 52 leading into the interface 100B also leads to a standard telephone 18, as better illustrated in FIG. 2. The telephone interface 110 includes a unit responsive to signalling (e.g., SS7 or DTMF) and a unit for the transmission link (e.g., T1 or any other member of the digital hierarchy, or DOV) between the CPD 10 and the central station. The interface thus receives a signalling portion and a data portion of a transmission from the central station via the line 52, e.g., in a conventional manner. The telephone interface 110 outputs the video portion of the title via the decompressor 111 to a video line 151, and outputs the audio portion over an audio line 152. Operation instructions for the CPD are decoded by the telephone interface 110 and preferably output over the audio line 152. The lines 151 and 152 lead to a switch 202 in the controller 200. The interface 110 also receives and forwards the prompt signals supplied from the controller 200 and destined for the central station 1, preferably over the audio line 152. As noted with respect to FIG. 4A, the decompressor 111 can be disposed in alternative locations within the CPD 10 or be omitted entirely if circumstances warrant.

FIG. 4C shows a combination interface 100C adapted to receive transmissions over either a cable system or a telephone network. The combination interface 100C includes a cable decoder 101, a telephone interface 110, a decompressor 120, and a switch 130. Operation of the interface 100C is analogous to that described with respect to FIG. 4A and FIG. 4B. The switch 130 is provided to properly route the title data, operations instructions and prompt signals to and from the appropriate line 51 or 52. The arrangements of FIGS. 4A and 4C preferably allow the CPD 10 to additionally function as a transparent conduit for traditional cable signals. Again, the decompressor 120 can be moved or omitted, as discussed in the descriptions of FIGS. 4A and 4B.

Figure 5:
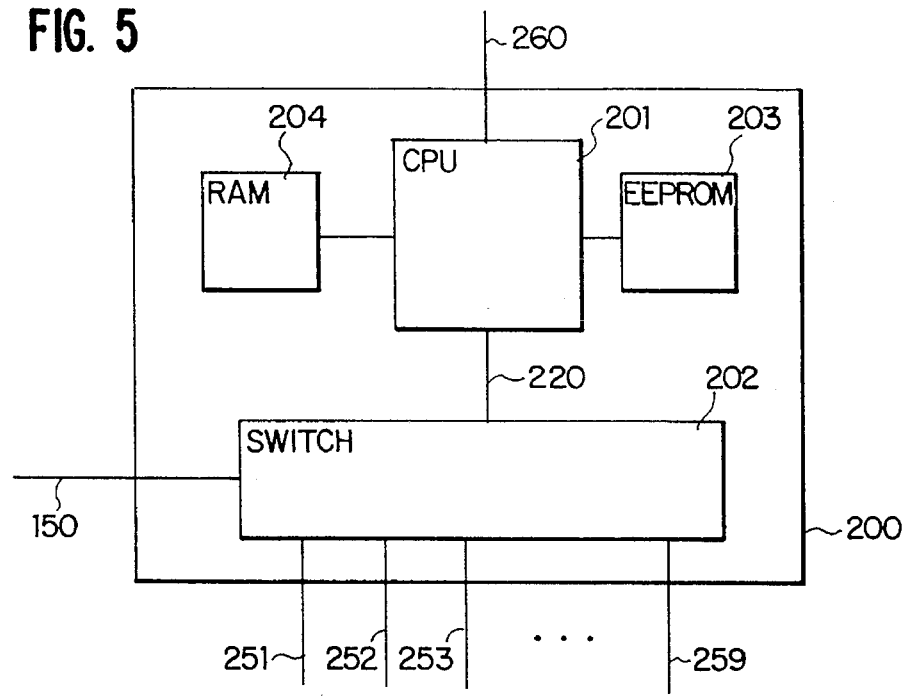
FIG. 5 illustrates one embodiment of the interface controller of FIG. 3.

FIG. 5 shows details of the internal structure of the interface controller 200 in block diagram form. The controller 200 is configured to be compatible with the SCP 6, from which the transmitted information (titles) originates, but otherwise can be designed to be independent of the communications medium 3 and much of the user premise equipment 20. The controller 200 can comprise a general-purpose microprocessor, preferably a microprocessor such as a microcontroller or an embedded controller (i.e., microprocessor, EEPROM, and A/D converter). As shown in the figure, the controller 200 preferably includes a CPU 201 with an associated EEPROM 203 and RAM 204. Alternative arrangements of the controller 200 can be configured to include converter units for converting signals input to the CPD 10 from the service provider's transmission path to signals compatible with the user's TV set, computer, etc.

The controller further includes a switch 202. The switch 202 connects to the first interface 100 over at least communication channel 150 (lines 151 and 152). Multiple signal lines 251–259 connect the switch 202 to the second interface 300. A signal path 220 provides a control and communications path between the CPU 201 and the switch 202. Finally, reference numeral 260 designates a signal path enabling the remote control commands from remote control 17 to reach the controller 200. Preferably the path 260 originates at an infra-red interface provided between the remote control 17 and the CPU 201. In one alternative arrangement, the remote control signals could be routed via the switch 202 to the CPU 201 rather than directly to the CPU 201.

The EEPROM 203 constitutes a semi-permanent memory that stores a limited number of operations algorithms. These operations algorithms provide the CPD 10 with sufficient intelligence, e.g., (a) to run diagnostics, (b) to contact and establish a transmission connection to the central station 1, (c) to recognize user commands input via the user premise equipment 20, e.g., via the remote 17, and forward them to the central station as needed, and (d) to receive and recognize operation instructions and information data streams sent from the central station 1. In other words, the EEPROM 203 is provided with rudimentary operating intelligence sufficient to enable it to establish communication between the user's premise equipment 20 and the central station 1 and to then regulate that communication with the aid of operations instructions supplied from the central station 1. It should be noted that the EEPROM 203 is, preferably, not configured to hold the operations instructions from the central station. This is, instead, a function of the RAM 204, as will be explained below. Rather, it is preferable that the EEPROM 203 be dedicated to the operations algorithms alone. This renders the overall CPD 10 of relatively low cost to construct, because the memory 203 need not be so large as to continuously and simultaneously hold programming for all available options and capabilities offered by the CPD. Instead, only a basic set of commands is stored, with control of most or all of the available options and capabilities being supplied from the central station 1 along with the data streams representing the title desired by the user. Providing the CPD with only limited intelligence, with most control functions being governed remotely by the service provider, allows the cost for each CPD to be limited considerably.

While the memory 203 could be constructed as a ROM or other type of permanent memory, preferably, it is constructed to be an EEPROM, programmable after leaving the factory. Most preferably, the EEPROM 203 should be electrically programmable from the central station 1 over the communications path 3 whenever it becomes necessary to correct or update the operations algorithms stored in EEPROM 203. This is especially beneficial since it saves in service and maintenance costs and ensures that the CPD 10 does not become outdated by the introduction of further services.

The RAM 204, on the other hand, is a volatile, i.e., temporary, memory that is provided for storing (a) user instructions entered, e.g., via the remote 17 and (b) the operations instructions received from the central station 1. Storage of such instructions may be needed (a) to buffer the instructions before they can be forwarded to either the first or second interface, (b) to temporarily hold instructions awaiting processing by the CPU 201, or (c) to temporarily store instructions for further use during a given on-line session. The RAM 204 also stores any processing results generated by the CPU 201 while the CPD 10 is on-line, although, if desired, processing results can alternatively be storm in a further RAM (not shown in the figures) dedicated to storing processing results. Finally, the RAM 204 can be used to buffer or store the actual information data requested by the user and sent from the central station 1, if needed. The RAM 204 can also store at least sufficient digital images to display an introductory screen on the subscriber equipment 20, if desired by the service provider. Again, a separate memory (not shown) can be provided for these purposes.

The operations instructions are stored in a RAM because, preferably, they are stored only as long as required to execute a particular function or command. Thereafter, they are written over by further operations instructions when the further instructions are needed for a further function or command. This conserves memory space and allows the CPD 10 to be implemented at comparatively modest cost. At least one complete set of operations instructions, for realizing the full repertoire of functions offered by the service provider's system, is stored in the SCP 6 at the central station 1 or at the facilities 2a of a remotely located service provider.

The CPU 201 processes the various signals made available to it, namely, (a) the operations algorithms stored in the EEPROM 203, (b) the user or other commands entered via the subscriber premise equipment 20 (e.g., the remote 17, the computer 14, the security device 16, etc.), and (c) the operations instructions received via the first interface 100 or temporarily stored in the RAM 204. This processing causes the CPU 201 to generate a variety of signals including prompt signals and processing results. The processing results are used internally by the CPD 10 for routing purposes and thus control the switch 202 and access the memories 203 and 204. The prompt signals, on the other hand, are forwarded via the first interface 100 to the central station, to prompt the central station to reply with responsive operating instructions and/or information data.

The switch 202 routes the various types of signals passing through the CPD 10 to their appropriate destinations. The switching performed by the switch 202 is controlled by the CPU 201 via the path 220 using some of the processing results generated by the CPU 201. The resulting switching operations establish a sequence of signal paths between respective signal sources and intended destinations. By changing the signal paths as dictated by the processing results, the limited-intelligence components forming the CPD 10 are able to support a multi-path interactive on-line communication in a cost-effective manner.

The switch 202 is preferably composed of logic elements, such as multiplexers and latches. Implementation of such a CPU and such a switch, given the enclosed disclosure, would be apparent to one skilled in the art. If implemented using current technology, preferably, VLSI chips or similar devices would be utilized, so that the CPD 10 can be constructed of relatively low cost and can be programmable from the central station with simple commands.

As indicated above, the operations instructions forwarded from the central station 1 constitute the major portion of the software required by the CPD 10 to execute its various functions during operation. The remaining portion of the software, as previously discussed, is formed by the operations algorithms internal to the CPD 10. The operations instructions and operations algorithms, following processing, yield prompt signals and processing results and cooperate in a manner enabling interactive communication between the user and the central station 1. By configuring the CPD 10 in this manner, it becomes possible to construct each individual CPD 10 of relatively unsophisticated components. Each component need have only limited intelligence since a large part of the operating intelligence is supplied from the central station 1. Further, no single component need be equipped with more than modest memory capabilities since the CPD 10 acquires most of its operating intelligence only on an as-needed basis and then discards it. A detailed description of the operation of the CPD 10 is deferred until later in this application.

Figure 6:
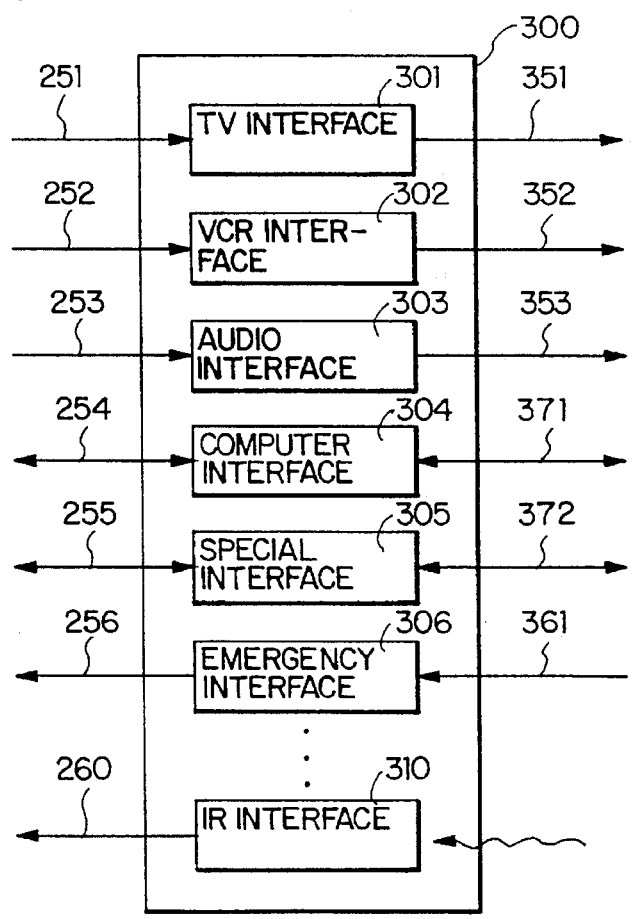
FIG. 6 illustrates one embodiment of the second interface of FIG. 3.

FIG. 6 shows a preferred embodiment of the second interface 300. Generally, the second interface contains a plurality of specific interfaces connecting the switch 202 of the controller 200 to the various pieces of user premise equipment available at the remote station 2. Thus, a TV interface 301 (e.g., PAL/NSTC interface) leads to the television 11 via an output line 351; a VCR interface 302 leads to the VCR 12 via output line 352; an audio interface 303 leads to the audio system 13 over output line 353; a computer interface 304 connects to the computer 14 via a two-way path 371; a special interface 305 connects any specialized equipment 15 over a two-way path 372; an emergency interface (e.g., with a line sensor) connects security or emergency sensors 16 and the like to the CPD 10 via an input line 361; and further interfaces connect other user premise equipment apparent to those skilled in the art into the CPD 10 (as indicated by the successive dots following interface 306). Finally, an infra-red or similar interface 310 couples the remote control 17 to the CPU 201 via the signal line 260.

Figure 7:
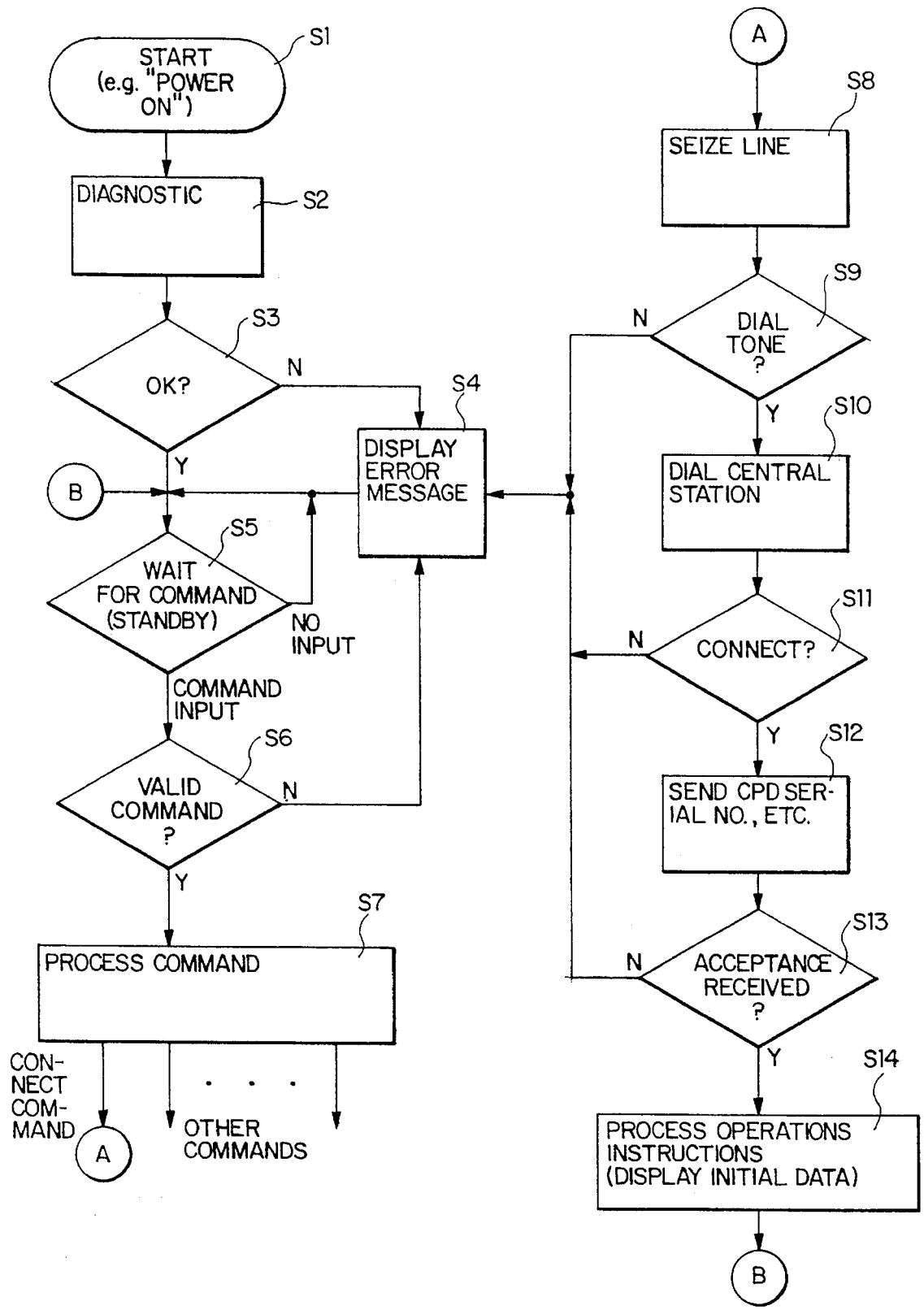
FIG. 7 is a flowchart illustrating in detail an illustrative operations scenario performed by a Customer Premise Device.
Figure 8:
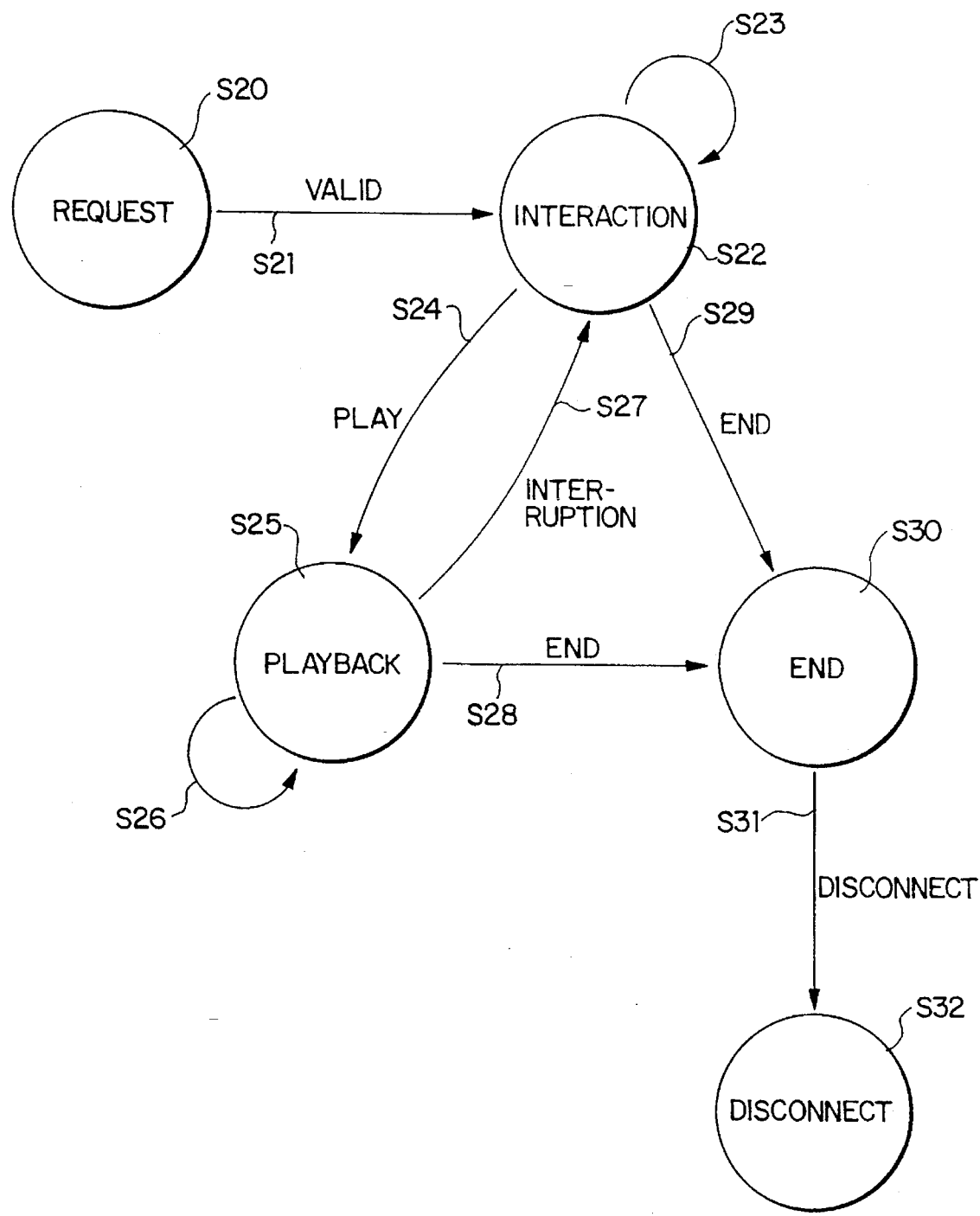
FIG. 8 is a bubble diagram showing a more generalized state analysis applicable to the present invention.
Figure 9:
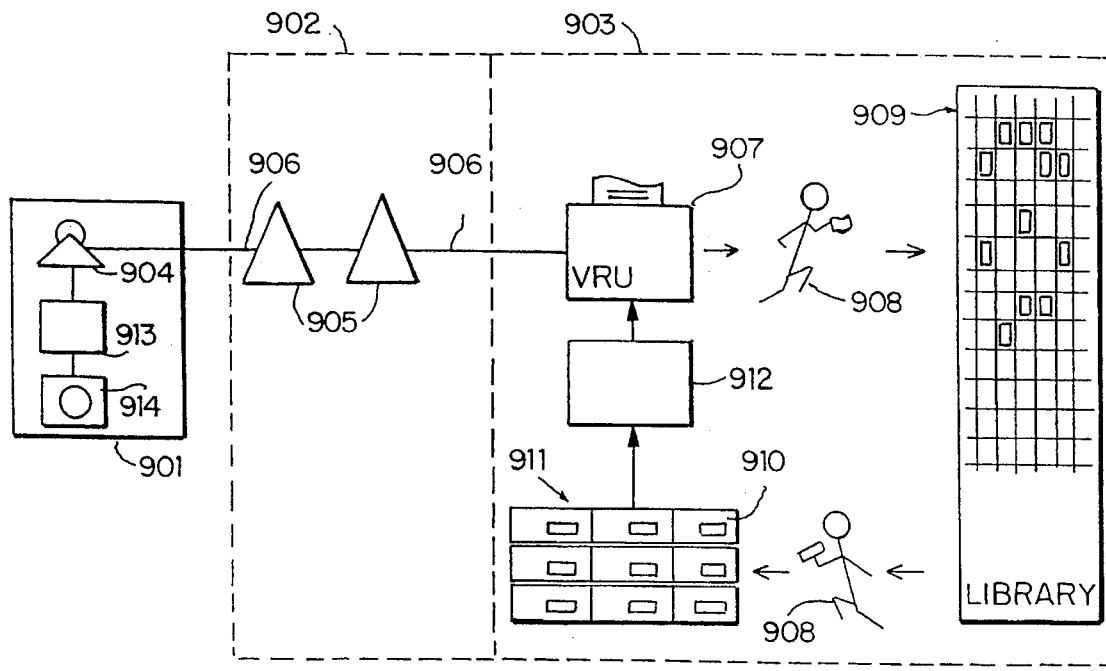
FIG. 9 shows a first related art system currently under development.
Figure 10:
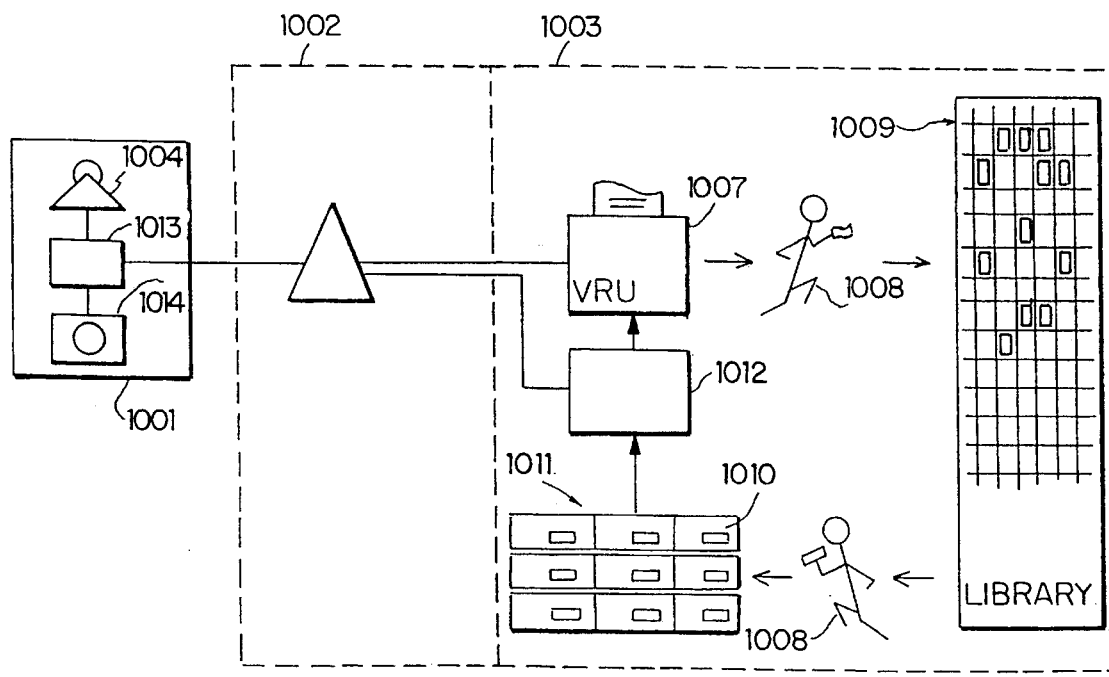
FIG. 10 shows a second related art system.
Figure 11:
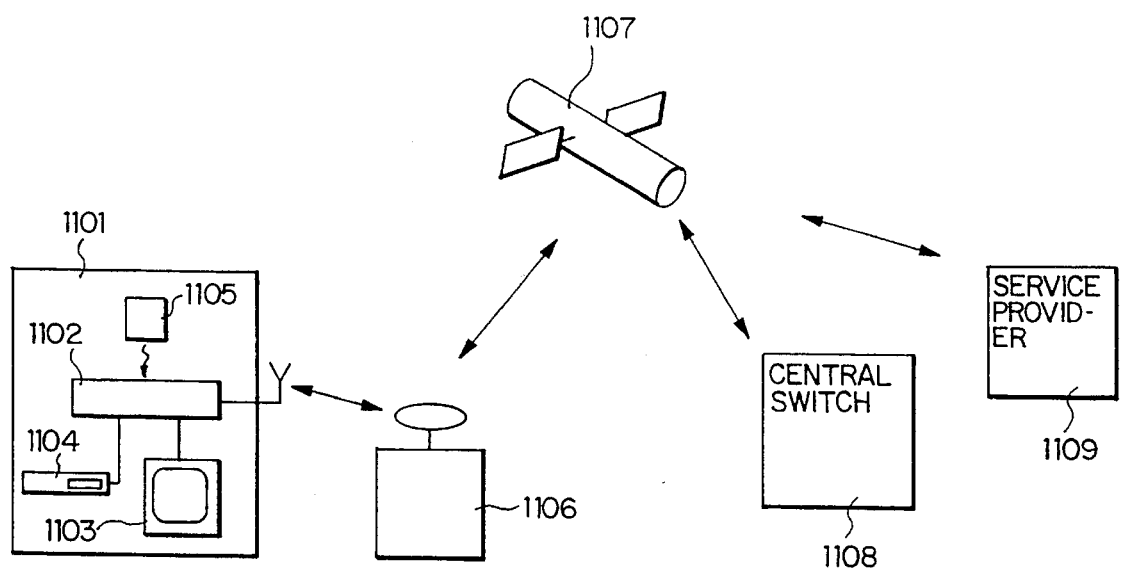
FIG. 11 shows a third related art system.

FIGS. 7–8; Operation Of the Customer Premise Device

To describe the operation of the preferred CPD 10, an illustrative interactive scenario for the CPD 10, including "power on", a user "connect" request, the SCP response, and the subsequent user response, will now be presented, with reference to FIG. 7. This illustrative scenario assumes that the CPD 10 communicates with an SCP 6 located at the central station 1 over a telephone network, and that the user is controlling the CPD 10 with a remote control 17, with the intention of selecting a movie to be output to a television 11.

The preferred option for initiating operation of the CPD 10 is supplying power to the CPU 201 (step S1). This prompts the CPU 201 to address a diagnostic program (step S2), comparable to those known in the art, which checks the EEPROM 203, the RAM 204, and the configuration of the CPD 10 (i.e., determines which of its interfaces 301–310 is connected with appropriate user premise equipment 20). Once the diagnostic program is successfully completed (step S3), the CPU 201 enters a standby mode and awaits an initial command (step S5). If the diagnostic program fails, internal software will cause an appropriate error message to be displayed, e.g., on TV 11 (step S4).

The initial command might originate from the central station (e.g., in situations where the EEPROM 203 is being updated), but generally will originate from the user, who enters a command from one of the peripherals 20, such as the remote control 17. In a typical situation, the initial command corresponds to the user pressing a "connect" button on the remote 17. The CPU 201 senses the command supplied via the IR interface 310 on line 260.

By resorting to the operations algorithms stored in EEPROM 203, the CPU 201 determines the validity of the initial command (step S6). If the command is determined to be invalid (e.g., a pause command would be invalid because, as yet, no title is playing), processing proceeds to step S4, to again display an appropriate error message. On the other hand, if the command is valid, the CPU processes and interprets the command, in this case, a "connect" command (step S7), again by resorting to the operations algorithms.

This results, in turn, in the CPU 201 generating one or more prompt signals, and generating appropriate switching signals to route the prompt signals to the central station. More specifically, the CPU 201 controls the switch 202 to activate the line 150, so that the prompt signals are output from the interface 100 with the central station 1 as their destination. In this particular case, the prompt signals equate with a telephone call or the like, and subsequent handshake protocols that alert the SCP 6 to the CPD's presence and configuration, and prompt the SCP 6 to send operations instructions and initial data streams in response. In practice, these protocols would normally involve seizing a line 3 in a conventional manner (step S8), sensing whether a dial tone has been obtained (step S9), dialing the central station (step S10), sensing a successful connect to the central station and receiving acknowledgement data from the SCP 6 (step S11), replying with a serial number and/or password unique to that particular CPD 10 and sending data indicative of the capabilities available at the remote station 2 (e.g., TV, VCR and stereo surround-sound system) (step S12). If the CPD 10 corresponds to a valid subscriber address, the SCP 6 will signal acceptance of the CPD's request to connect (step S13). If any of the steps S8 to S13 are unsuccessful, this is explained to the subscriber in the form of an appropriate error message (step S4).

Following this sequence of prompt signals, the SCP 6 replies with initial information data streams and corresponding operations instructions tailored to the intelligence and functional capabilities of that CPD 10. The initial data streams correspond, e.g., to a menu of options to be displayed on the user's television 11 (step S14). If the initial information data (menu) is compressed data, the decompressor 111 (see FIG. 4B) decompresses this data accordingly. The initial operations instructions inform the CPD 10, and the CPU 201 in particular, of the nature of the data streams and the appropriate peripheral to which the data streams are to be routed. As such, the CPU 201 processes the operations instructions with the help of its local operations algorithms and generates appropriate processing results. The CPU 201 also stores some or all of either the operations instructions or the processing results, or both, in the RAM 204 if dictated by either the operations instructions or the local operations algorithms, or both. In this particular scenario being described, the processing results enable the controller 200 to route the initial data streams from the first interface 100, through the switch 202, and to the TV interface 301, so that the initial information data (e.g., menu of options) may be displayed on the television 11 (step S14). The CPU 201 then again enters a standby mode, awaiting a further user command.

During this particular standby mode, the menu is continuously displayed on the screen of the television 11 and the CPD 10 waits for a further command from the user (step S5). After the user has reviewed the menu, the user inputs a selection, for example a more specific category (e.g., "Movies", "Current Movies", "Movie Classics", etc.) or a particular request (e.g., "Casablanca") (steps S6 and S7). Internal operation within the CPD 10 then proceeds much as described for processing of the "connect" command, except that the particular user command will cause operation of the CPU 201 to branch to other appropriate processing (see step S7). The controller 200 detects the user's selection command on line 260 and generates appropriate prompt signals and routing signals for the selection command, to forward data representing the user's selection to the central station 1.

FIG. 8 is a bubble diagram illustrating a state analysis for the CPD 10. Whereas FIG. 7 provided a detailed flowchart illustrating the progression of processing within the CPD 10, FIG. 8 illustrates in more general terms the stages of communication during a given on-line session. Request state S20 corresponds to previously described step S6 (FIG. 7), where the system (i.e., CPD 10 and SCP 6) awaits a valid input command, e.g., "Connect" command. State transition S21 corresponds to step S6 of FIG. 7, at which point the system is forced out of state S20, permitting the user to access the services available from the SCP 6. The state transition S21 prompts the CPD 10 and SCP 6 to interact via prompt signals and responsive operation instructions, as indicated by state S22. As such, the interaction S22 corresponds to the processing required to analyze and respond to the user request prompted by the state transition S21. As described previously, it involves the processing and forwarding of prompt signals and operation instructions, the generation of processing results, the routing of data streams, and so forth (see steps S7–S14 in FIG. 7).

The processing of state S22 may be performed in multiple stages, as indicated by state transition S23. For instance, a series of communications between the user and the SCP 6 may be exchanged before an actual title (e.g., movie, videogame, specific informational database, etc.) is provided. Examples include a screen welcoming the user to the service, various levels of menus, each more specific than the one before, to focus in on a particular title, playback options available to the user (e.g., selecting between original language and dubbed versions of a movie, difficulty levels in a game, etc.), and any other prompts to take action or information the SCP 6 or user wish to impart to the other (e.g., cost for a title selected, etc.). At each stage, prompt signals, operating instructions and processing results regulate the details of communication exchange between the user and the SCP 6.

The next state transition S24 takes place when the user responds with a specific selection for a specific rifle. The system then again interacts via prompt signals and operation instructions, with the CPD 10 producing processing results that enable playback of that title (state S25) on selected subscriber premise equipment 20. Playback continues uninterruptedly, as indicated by transition state S26, until either the title reaches its end or playback is interrupted.

The term "playback" refers generically to the output of data in predetermined format and sequence to one or more pieces of subscriber equipment 20 (i.e., output of a data stream). For instance, if a movie is "played back", its video portion is output to the TV 11 while its audio portion is supplied to speakers internal to the TV 11 or to external speakers 13. "Playback" of results of a database search generally involve displaying "hits" in a predetermined sequence on the screen of a computer 14 or on the printout of a printer. "Playback" of a videogame constitutes displaying an initial sequence of moves on a computer 14 or special interface 15 until the subscriber makes a response move.

Playback can be interrupted, as illustrated by state transition S27, either by the equipment 20 at the remote station 2 or by the SCP 6. State transition S27 triggers the system to return to the state S22, in which the CPD 10 and the SCP 6 interact. For instance, a user request entered via remote 17 to pause, fast-forward, stop, or otherwise affect playback, triggers transition state S27 to return the system to the interactive processing of state S22. As another possibility, some specific piece of equipment 20, such as the security/ emergency device 16, or some signal detected on communications line 50 can trigger an interrupt without the user himself taking action. (E.g., an incoming or outgoing telephone call, fax transmission, etc. or an emergency or alarm signal generated by the device 16 is detected by the CPD 10 as an abnormal line event requiring the CPD to interrupt the playback and relinquish control of the line or take responsive action.) For interactive rifles, such as videogames, on-line databases being searched, interactive educational services, etc., the interruption normally equates with the user's response action to the information just played back. Interruptions triggered from the SCP 6 are equally feasible, if warranted.

Playback interruptions, as just described, equate with "Other Commands" that can be input into and processed by the CPD 10 (see FIG. 7, steps S5–S7). In the case of such playback interruptions, the operations performed by the CPD 10 are generally analogous to those described in conjunction with steps S8–S14, in that they involve a sequence of exchanges of signals and instructions between the CPD 10 and the SCP 6. Specifically, the CPD 10 again accesses operations algorithms, generates prompt and switching signals and receives operation instructions. However, of course, unlike steps S8–S14, the operations steps performed following input of one of the "Other Commands" do not establish a connection and exchange handshake protocols with the SCP 6, as described with respect to steps S8–S14 of FIG. 7. Rather, the CPD 10 branches to a processing routine governing the particular "Other Command", with the operations algorithms, prompt and switching signals, and operation instructions corresponding to the particular playback interruption being processed.

In interaction state S22, the SCP 6 determines the most appropriate response to the interruption request, and responds accordingly (see state transitions S23 and S24, described above). For a request to pause, fast-forward, etc., the SCP 6 regulates the data stream to match the request and, if necessary, provides updated operation instructions enabling the CPD 10 to process the new form of playback. In the case of an alarm signal originating from the device 16, the SCP 6 responds by forwarding the alarm to an appropriate emergency center and, preferably, playing back a warning message to the user to inform the user of the danger. Similarly, attempts to seize the line 50 (e.g., by way of an incoming or outgoing telephone call) result in the SCP 6 and CPD 10 temporarily surrendering the line, permitting the line to be used for the interruption (e.g., so that the user can receive or make a telephone call, etc.). (Erroneous disconnections between the CPD and the SCP most preferably trigger a response by the CPD 10, based on operations algorithms, to re-establish the link and inform the user of the state of affairs by way of a display message, as shown in step S4 of FIG. 7.) User response actions for interactive titles result in the SCP 6 preparing and forwarding the SCP's response.

As should be evident from the above, communication back and forth between the subscriber's premise equipment 20 and the SCP 6 progresses in accordance with states S22 and S25, and state transitions S23, S24, S26 and S27. As circumstances warrant, the SCP 6 updates the CPD 10 with new operation instructions.

The end of playback can be initiated either by the SCP 6 or the user via premise equipment 20. If the title simply reaches its end, as would often be the case, e.g., for a movie selection, the system transfers from state S25 to end state S30 via transition S28. Alternatively, if the user wishes to end the session, e.g., in the case of an on-line search, the user prompts termination of the session by an appropriate interruption (transition S27) that causes SCP 6 to end transmission of the tide (transition S29). In either case, the system proceeds to a state S30 in which the communications between the CPD 10 and the SCP 6 are brought to a close. Finally, transition S31 places the system in a state S32, in which the line between the CPD 10 and the SCP 6 is disconnected.

In the manner described, the CPD 10 can regulate a wide variety of communications between the SCP 6 and the user. Examples of communications include information to assist the user in selecting a title, previews of titles, titles themselves (movies, video games, educational programming, business, scientific and consumer information, etc.), and interactive communications such as on-line database searching, networked remote-station video-game competitions, personalized home shopping, and the like. Indeed, the only apparent limitation on the type of information that can be communicated is that it must be capable of being converted into a stream of data. As such, the present invention provides a powerful and flexible medium for information exchange of truly limitless potential. The above description of the preferred embodiments has been given by way of example. From the disclosure given, those skilled in the art will not only understand the present invention and its attendant advantages, but will also find apparent various changes and modifications that can be made to the methods and structures disclosed. It is sought, therefore, to cover all such changes and modifications as fall within the spirit and scope of the invention, as defined by the appended claims, and equivalents thereof.

We claim:

1. A customer premise device for controlling transmissions, including data streams representing interactive services information carried over a communications medium, between a central information source configured to administrate the interactive services information and customer premise equipment housed at a remote station, comprising:

a first interface linked to the communications medium;

a second interface linked to the customer premise equipment; and an interface controller linking said first interface and said second interface, said interface controller comprising:

an operations memory for storing a limited number of operations algorithms;

an instructions memory for temporarily storing operation instructions received via at least one of said interfaces; and a processor for accessing any of said operations memory, said instructions memory and said interfaces, for processing the operations algorithms and operation instructions, thereby generating prompt signals and processing results, for routing the prompt signals to at least one of said interfaces or one of said memories in accordance with the processing results, whereby said processor routes at least a portion of the prompt signals to the communications medium via said first interface for the purpose of soliciting at least a portion of the operation instructions from the central information source, and for routing the data streams, supplied over the communications medium, from said first interface to said second interface, in accordance with the processing results.

2. A customer premise device according to claim 1, wherein said first interface comprises:

a decoder having an input linked to the communications medium and having a first output and a second output, the first output being configured to output video data streams, and the second output being configured to output audio data streams and operation instructions supplied over the communications medium; and a decompressor having an input linked to the first output of said decoder and an output linked to said interface controller.

3. A customer premise device according to claim 2, wherein said decoder has a further input linked to said interface controller and has a further output linked to the communications medium, the further input and the further output being configured to route the prompt signals and operation instructions supplied from the customer premise equipment to the communications medium.

4. A customer premise device according to claim 1, wherein said first interface comprises:

a telephone interface having an input linked to the communications medium and having a first output and a second output, the first output being configured to output video data streams, and the second output being configured to output audio data streams and operation instructions supplied over the communications medium; and a decompressor having an input linked to the first output of said telephone interface and an output linked to said interface controller.

5. A customer premise device according to claim 4, wherein said telephone interface has a further input linked to said interface controller and has a further output linked to the communications medium, the further input and the further output being configured to route the prompt signals and operation instructions supplied from the customer premise equipment to the communications medium.

6. A customer premise device according to claim 1, wherein said interface controller comprises:

a microprocessor;

a semi-permanent memory, configured to be addressable by said microprocessor, for storing at least a portion of the operations algorithms;

a random access memory, configured to be addressable by said microprocessor, for storing at least a portion of the processing results; and a switch, controlled by said microprocessor, and interconnected between said first interface and said second interface, for routing the prompt signals, the operation instructions and the data streams.

7. A customer premise device according to claim 1, wherein said second interface comprises:

a television interface interconnected between said interface controller and a television set.

8. A customer premise device according to claim 1, wherein said second interface comprises:

a computer interface interconnected between said interface controller and a computer.

9. A customer premise device according to claim 1, wherein said second interface comprises:

an interface having an input for signals received from a remote control unit and having an output electrically connected to said interface controller.

10. A customer premise device according to claim 1, wherein said second interface comprises:

an interface comprising a line sensor, said interface and said line sensor being interconnected between said interface controller and an alarm unit.

11. A customer premise device according to claim 1, wherein the interactive services information comprises audio-visual information.

12. A customer premise device according to claim 11, wherein the audio-visual information comprises movies.

13. A customer premise device according to claim 11, wherein the audio-visual information comprises television programming.

14. A customer premise device according to claim 11, wherein the audio-visual information comprises videogame programming.

15. A customer premise device according to claim 1, wherein the interactive services information comprises audio information.

16. A customer premise device according to claim 15, wherein the audio information comprises+music.

17. A customer premise device according to claim 1, wherein the interactive services information comprises video information.

18. A customer premise device according to claim 17, wherein the video information comprises online text information.

19. A method for supplying a remote station with transmitted interactive services information originating from a central station configured to administrate the information, comprising the steps of:

providing a communications link between the central station and the remote station, the communications link having a remote station end;

connecting a customer premise device to the communications link at the remote station end and connecting the customer premise device to customer premise equipment;

providing the customer premise device with a limited amount of control logic sufficient to:

generate prompt signals in response to command signals input by a customer via the customer premise equipment, forward the prompt signals to the communications link to be supplied to the central station, for the purpose of soliciting control signals from the central station, generate processing signals in response to the solicited control signals input from the central station via the communications link, and route the transmitted information to the customer premise equipment in accordance with the processing signals.

20. A method according to claim 19, further comprising the step of providing the customer premise device with a memory for storing the control logic.

21. A method according to claim 20, further comprising the step of providing the customer premise device with a volatile memory for temporarily storing the control signals.

22. A customer premise device according to claim 1, wherein said instructions memory temporarily stores operation instructions received from the central information source over the communications medium.

23. A customer premise device according to claim 1, wherein said operations memory is a semi-permanent memory.

24. A customer premise device according to claim 1, wherein the limited number of operations algorithms enable at least the following customer premise device functions:

a) execution of a self-diagnostic program;

b) establishing a transmission connection to the central information source over the communications medium;

c) receiving and processing at least one of the operation instructions input by the customer as a user command via the customer premise equipment and said second interface; and d) receiving and processing at least one other of the operation instructions received from the central information source via the communications medium and said first interface.

25. A customer premise device according to claim 1, wherein:

at least one of the prompt signals is routed via the first interface and the communications medium to the central information source, in order to prompt the central information source to reply by transmitting at least one of the operation instructions.

26. A customer premise device according to claim 25, wherein the operation instructions transmitted by the central information source enable said interface controller to control the following customer premise device functions:

a) playback of the data streams on the customer premise equipment;

b) pause of the data streams on the customer premise equipment;

c) fast-forward of the data streams on the customer premise equipment; and d) fast-reverse of the data streams on the customer premise equipment.

27. A method according to claim 19, wherein the prompt signals prompt the central station to reply by transmitting at least one responsive control signal.

28. A method according to claim 27, wherein the control signals from the central station enable the following customer premise device functions:

a) playback of the transmitted information on the customer premise equipment;

b) pause of the transmitted information on the customer premise equipment;

c) fast-forward of the transmitted information on the customer premise equipment; and d) fast-reverse of the transmitted information on the customer premise equipment.

29. A method according to claim 19, wherein the transmitted information comprises audio-visual information.

30. A method according to claim 29, wherein the audio-visual information comprises movies.

31. A method according to claim 29, wherein the audio-visual information comprises television programming.

32. A method according to claim 29, wherein the audio-visual information comprises videogame programming.

33. A method according to claim 19, wherein the transmitted information comprises audio information.

34. A method according to claim 33, wherein the audio information comprises music.

35. A method according to claim 19, wherein the transmitted information comprises video information.

36. A method according to claim 35, wherein the video information comprises online text information.

37. A customer premise device for controlling transmissions that include informational data representing interactive services information between a central information source and customer premise equipment housed at a remote station, which are carried over a communications medium, comprising:

interface means (i) for linking the customer premise equipment with the communications medium, (ii) for routing the informational data received via the communications medium to at least one destination within the customer premise equipment, (iii) for outputting prompt signals, and (iv) for receiving operation instructions;

memory means (i) for storing a limited number of internal operations algorithms and (ii) for storing only temporarily the operation instructions received via said interface means;

processing means, operating in accordance with the operations algorithms and the received operation instructions (i) for generating the prompt signals and outputting the prompt signals via said interface means, at least some of the prompt signals being output to the communications medium for the purpose of soliciting at least a portion of the operation instructions from the central information source and (ii) for generating and utilizing processing results, at least some of the processing results being utilized for the purpose of controlling the routing of the informational data by said interface means.

38. A customer premise device according to claim 37, wherein said processing means is further (iii) for controlling said memory means to temporarily store the received operation instructions and to delete the received operation instructions.

39. A customer premise device according to claim 38, wherein said processing means controls said memory to discard the received operation instructions after said processing means has performed a given operation in accordance with the received operation instructions.

40. A customer premise device according to claim 38, wherein said processing means, operating in accordance with the operations algorithms and the received operation instructions, monitors the status of a current session of transmitting the informational data, and controls said memory to delete the received operation instructions after the current session of transmitting the informational data is completed.

41. A customer premise device according to claim 37, wherein:

said memory means comprises re-writable, semi-permanent memory for storing the operations algorithms; and said processing means is further (iii) for controlling said memory means to update the stored operations algorithms with updated operations algorithms received from the central informational source via the communications medium and said interface means.

42. A customer premise device according to claim 37, wherein the limited number of internal operations algorithms enable at least the following customer premise device functions:

a) execution of a self-diagnostic program;

b) establishing a transmission connection to the central information source over the communications medium;

c) receiving and processing at least one of the operation instructions input by the customer as a user command via the customer premise equipment and said interface means; and d) receiving and processing at least one other of the operation instructions received from the central information source via the communications medium and said interface means.

43. A method of receiving interactive services information, originating from an information source, at a customer premise location remote from the information source and having user-operated customer premise equipment, comprising the steps of:

utilizing operations algorithms stored at the customer premise location to generate prompt signals in response to command signals input by the user into the customer premise equipment;

outputting the prompt signals to a central station that is configured to administrate the interactive services information and that is remote from the customer premise location, for the purpose of soliciting information control instructions from the central station;

receiving the solicited information control instructions from the central station;

receiving the interactive services information from the information source;

utilizing the received information control instructions to process the received interactive services information and output the processed interactive services information to the customer premise equipment.

44. The method according to claim 43, wherein the information source is housed in the central station.

45. The method according to claim 43, wherein the information source is housed in a further customer station remote from the customer premise location.

46. The method according to claim 43, wherein the information received from the central information source is received substantially in real time.

47. The method according to claim 43, wherein said step of utilizing the received information control instructions comprises generating processing signals for controlling processing of the received interactive services information and for controlling output of the processed information to the customer premise equipment.

48. The method according to claim 43, further comprising the step of discarding the received information control instructions after said step of utilizing the received information control instructions.

49. The method according to claim 43, wherein said step of utilizing the received information control instructions provides one of the following customer premise equipment functions:

a) playback of the received interactive services information on the customer premise equipment;

b) pause of the received interactive services information on the customer premise equipment;

c) fast-forward of the received interactive services information on the customer premise equipment; and d) fast-reverse of the received interactive services information on the customer premise equipment.

* * * * *

UNITED STATES PATENT AND TRADEMARK OFFICE
CERTIFICATE OF CORRECTION

PATENT NO.    :   5,553,311
DATED         :   September 3, 1996
INVENTOR(S)   :   McLaughlin et al.

It is certified that error(s) appears in the above-identified patent and that said Letters Patent is hereby corrected as shown below:

On the title page: Item [75]

Change address of inventor M. James Bullen from "Oakville, Canada" to --Reston, VA--;

Signed and Sealed this

Fourth Day of March, 1997

*Attest:*

BRUCE LEHMAN

*Attesting Officer*        *Commissioner of Patents and Trademarks*